United States Patent
Feghali et al.

(10) Patent No.: US 7,953,221 B2
(45) Date of Patent: May 31, 2011

(54) METHOD FOR PROCESSING MULTIPLE OPERATIONS

(75) Inventors: Wajdi Feghali, Boston, MA (US); Stephanie Hirnak, Bedford, NH (US); Makaram Raghunandan, Northboro, MA (US); Yogesh Bansal, Ashland, MA (US); Kirk Yap, Framingham, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1096 days.

(21) Appl. No.: 11/617,418

(22) Filed: Dec. 28, 2006

(65) Prior Publication Data

US 2008/0159528 A1    Jul. 3, 2008

(51) Int. Cl.
*H04K 1/00* (2006.01)
*H04K 1/04* (2006.01)
*H04K 1/06* (2006.01)
*H04L 9/00* (2006.01)
*H04L 9/28* (2006.01)
*H04L 9/32* (2006.01)

(52) U.S. Cl. ............. 380/28; 380/36; 713/168; 713/170
(58) Field of Classification Search .................... 380/28, 380/36; 713/168, 170
See application file for complete search history.

(56) References Cited

U.S. PATENT DOCUMENTS

| | | | |
|---|---|---|---|
| 6,061,449 A | 5/2000 | Candelore et al. | |
| 6,088,800 A | 7/2000 | Jones et al. | |
| 2005/0149744 A1* | 7/2005 | Sydir et al. | 713/189 |
| 2009/0119774 A1* | 5/2009 | Moss | 726/23 |

FOREIGN PATENT DOCUMENTS

| | | |
|---|---|---|
| KR | 1020030043447 A | 6/2003 |
| WO | 2005001685 A1 | 1/2005 |
| WO | 2008082843 | 7/2008 |

OTHER PUBLICATIONS

International Preliminary Report on Patentability for PCT Patent Application No. PCT/US2007/086555 mailed on Jul. 9, 2009. 8 pages.
The International Search Report and the Written Opinion of the International Searching Authority for the PCT Patent Application No. PCT/US2007/086555, mailed on Mar. 28, 2008, 12 Pages.

* cited by examiner

*Primary Examiner* — Kambiz Zand
*Assistant Examiner* — Benjamin A Kaplan
(74) *Attorney, Agent, or Firm* — Grossman, Tucker, Perreault & Pfleger PLLC (57) ABSTRACT

In one embodiment, the present disclosure provides a method capable of processing a variety of different operations. A method according to one embodiment may include loading configuration data from a shared memory unit into a hardware configuration register, the hardware configuration register located within circuitry included within a hardware accelerator unit. The method may also include issuing a command set from a microengine to the hardware accelerator unit having the circuitry. The method may additionally include receiving the command set at the circuitry from the microengine, the command set configured to allow for the processing of a variety of different operations. The method may further include processing an appropriate operation based upon the configuration data loaded into the hardware configuration register. Of course, many alternatives, variations and modifications are possible without departing from this embodiment.

29 Claims, 6 Drawing Sheets

METHOD FOR PROCESSING MULTIPLE OPERATIONS

FIELD

The present disclosure describes a system, method and apparatus capable of processing a variety of different operations.

BACKGROUND

In general, a hardware accelerator is a piece of hardware that may be designed to perform a computation in place of software. In some cases, special-purpose hardware may perform computations much faster than software. In cases where performance is crucial, such as security, the cost of dedicated hardware may be worth the improved performance it provides.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Some security accelerators may be designed to support a wide variety of cipher and authentication (i.e. hash) operations. In some cases, each operation may have its own unique set of parameters and modes of operation. Due to the large number of potential combinations of operations and their modes, the firmware required to support the ability to interleave packets that require different cipher and/or hash processing may be quite complex. This may result in more complex code, which may consume more overhead, thus negatively effecting performance and cost.

Generally, this disclosure describes a system, method and apparatus capable of processing operations while reducing the complexity and amount of code required in firmware. In one embodiment, this disclosure may implement hardware features that enable the firmware to process data without knowing the cipher or hash operation that is currently being executed in the hardware. In some embodiments, one hardware cipher command set may be used to process a variety of cipher operations. Similarly, the same hardware hash command set may be used to process a variety of hash operations. The embodiments described herein may shield the firmware from identifying which particular type of operation is being performed in the hardware. Embodiments of this disclosure may eliminate the need for cipher and/or hash specific firmware, allowing data to flow through the hardware in the same manner regardless of its intended destination.

Figure 1:
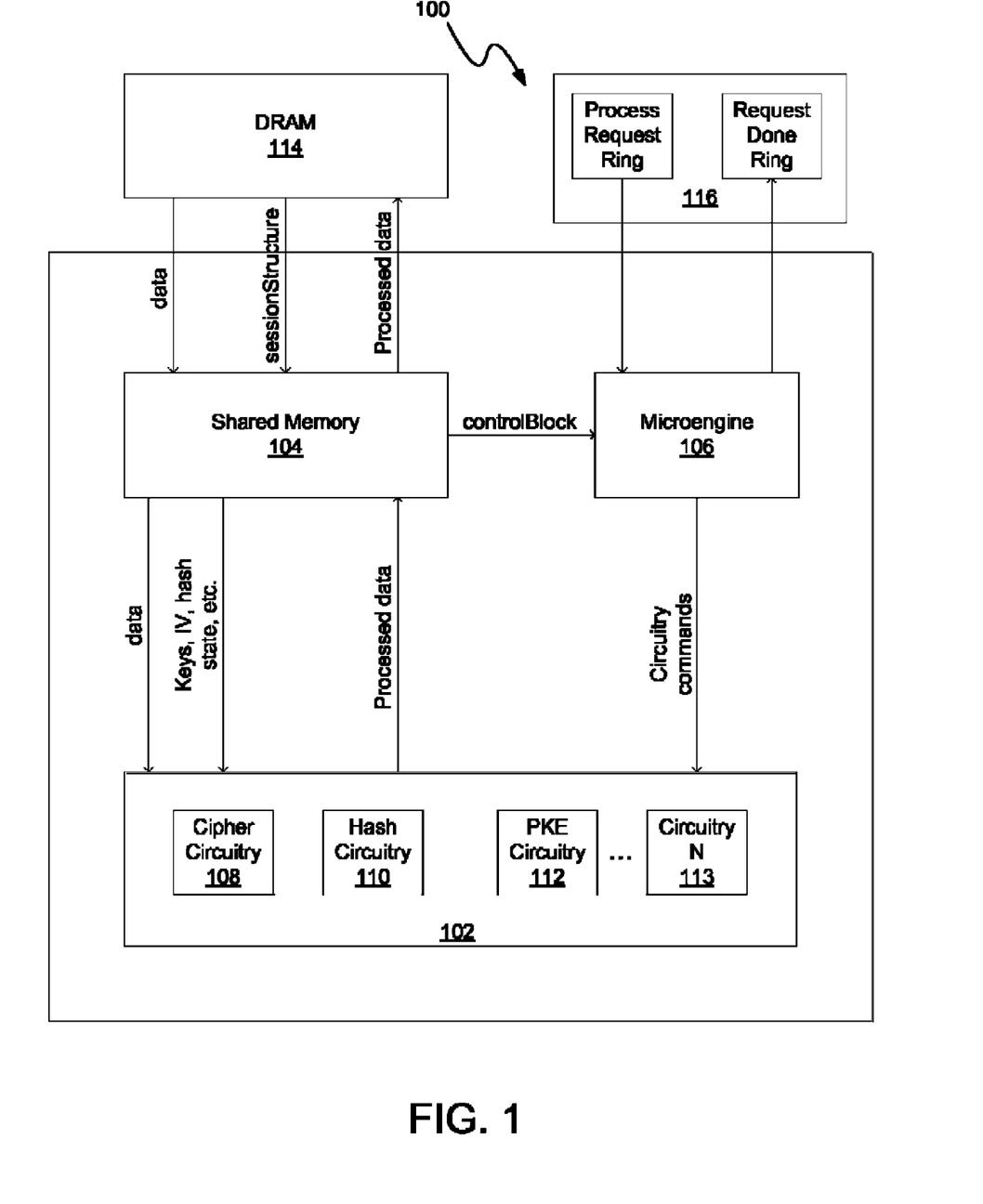
FIG. 1 is a block diagram showing one exemplary embodiment in accordance with the present disclosure.

FIG. 1 is one exemplary system embodiment 100 in accordance with the present disclosure. This embodiment may include a hardware accelerator unit 102 and a memory unit 104, which may be supported by firmware running on a dedicated microengine (ME) 106. Hardware accelerator unit 102 may include individual circuitry components, such as cipher circuitry 108, hash circuitry 110 and public key encryption (PKE) circuitry 112. Of course, other types of circuitry are envisioned (e.g., circuitry N 113) and may be included within hardware accelerator unit 102. Each of the circuitries of accelerator unit 102 may be configured to perform a separate task. For example, cipher circuitry 108 may contain hardware units that may be configured to implement cipher operations, which may include, but are not limited to, Data Encryption Standard (DES), Triple Data Encryption Standard (3DES), Advanced Encryption Standards (e.g., AES-128, AES-192, AES-256), Rivest Cipher (RC) standards and Kasumi. Similarly, authentication (or hash) circuitry 110 may contain hardware units that may be configured to implement certain hash operations, which may include, but are not limited to, Message Digest s (e.g., MD5) and secure hash s (e.g., SHA-1, SHA-X, etc.).

Microengine 106 may include firmware that may be configured to manage the movement of configuration data and user payload/data to and from each individual circuitry component of hardware accelerator unit 102. The term "configuration data" as described herein may refer to all the information needed by the hardware to execute a particular operation (e.g. a cipher, hash, or both) on the user payload. For example, the cipher keys, cipher initialization vectors (IVs), cipher padding, hash state, etc. may be contained within this configuration data. Note that the actual contents of the configuration data may be unknown to the microengine firmware. The microengine firmware may also be configured to issue the hardware commands for each particular circuitry component that it is using.

Shared memory 104 may be in communication with hardware accelerator unit 102, microengine 106 and external memory unit 114. Shared memory 104 may be configured to receive data from external memory 114 and to transmit processed data back to external memory 114. Further, shared memory 104 may be configured to receive and/or transmit data to/from the different circuitry components of hardware accelerator unit 102. Shared memory 104 may also be configured to store control information, which may be accessed by microengine 102. Shared memory 104 and external memory unit 114 may comprise one or more of the following types of memories: semiconductor firmware memory, programmable memory, non-volatile memory, read only memory, electrically programmable memory, random access memory (RAM), flash memory (which may include, for example, NAND or NOR type memory structures), magnetic disk memory, and/or optical disk memory. In some embodiments, memory 104 and 114 may comprise DRAM as well as other and/or later-developed types of computer-readable memory.

In operation, the microcode of microengine 106 may receive a request to process a packet from a request ring 116. The microcode may be configured to obtain pointers to the source buffer and an indication as to the type of operation to be done on the packet (e.g., cipher and/or hash). In some embodiments, no information may be provided regarding the actual cipher (e.g., AES) or hash (e.g., SHA) that will be performed in the hardware. The microcode may be further configured to transfer packet data and the source buffer from external DRAM 114 to locally shared memory 104. The microcode may read the control block out of the source buffer. The control block, an example of which is shown in the source buffer data structure of FIG. 3, may include all of the information necessary for the microengine to format the proper circuitry commands for the circuitries of hardware acceleration unit 102 (e.g., cipher 108, hash 110, pke 112, etc.). Further, the control block may be configured to move the data and state information from shared memory 104 to the circuitry components of hardware accelerator unit 102. The control block may also include information necessary for transferring processed data out of a particular circuitry component (e.g. hash circuitry 110) and back into shared memory 104.

Figure 2:
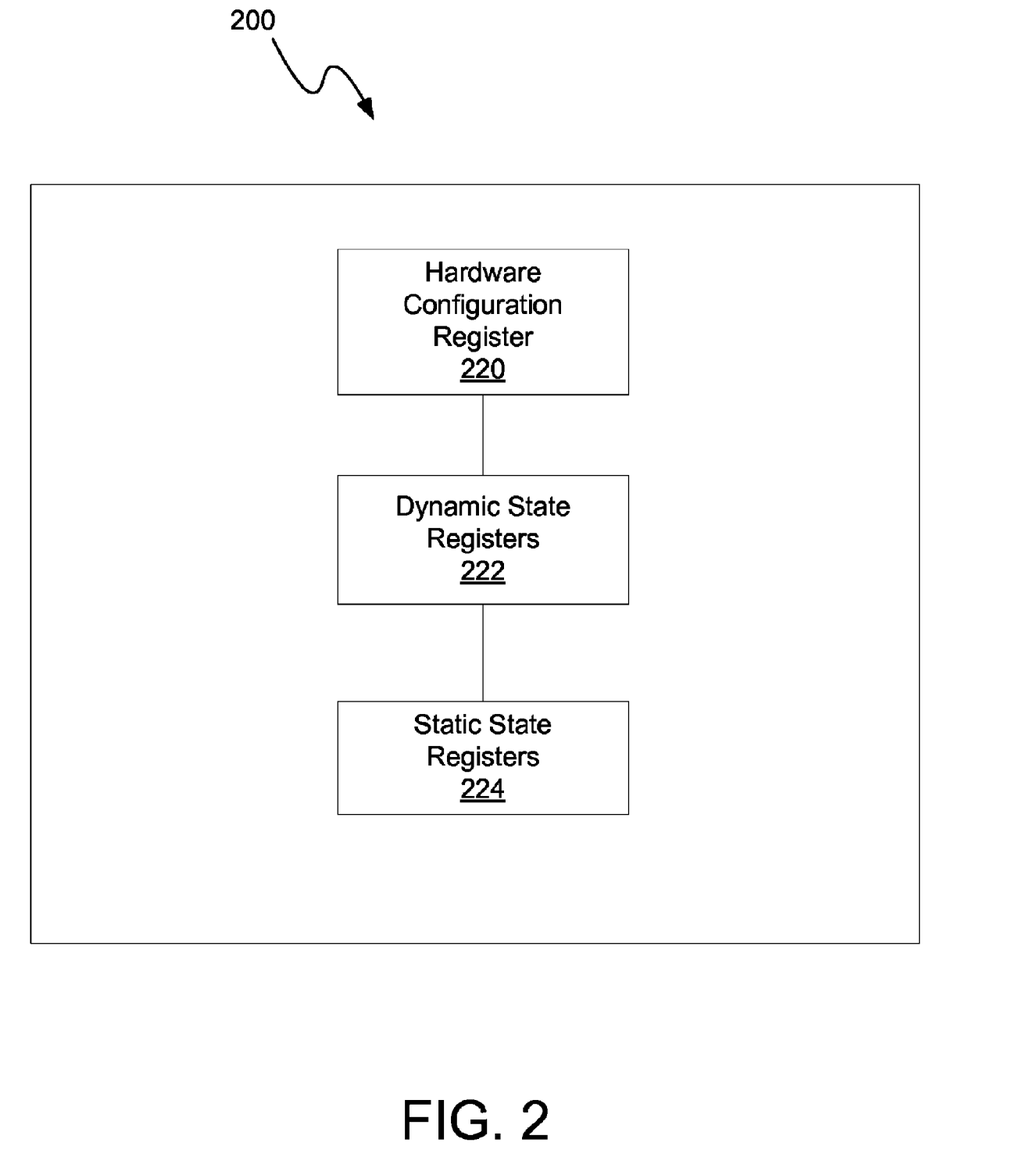
FIG. 2 is a block diagram showing further detail of the hardware accelerator in accordance with another exemplary embodiment of the present disclosure.

FIG. 2 shows an exemplary embodiment of a circuitry component 200 in accordance with the present disclosure. Some or all of the circuitry components located in hardware acceleration unit 102 may include a hardware configuration register 220, a dynamic state register 222 and a static state register 224. Hardware configuration register 220 may be configured to set the particular operation or mode of operation for a given circuitry. For example, the firmware may load each hardware configuration register 220 with data that will indicate the operation or mode of operation for the current data to be processed. The hardware may perform the appropriate operation processing based upon the contents of configuration register 220. Based on the contents of hardware configuration register 220, the hardware may interpret subsequent instructions to the circuitry component appropriately. For example, this feature may allow the firmware to execute the same instruction set to a circuitry component irrespective of the actual type of operation that is in use.

As mentioned above, circuitry 200 may further include dynamic state registers 222 and static state registers 224. Some embodiments of the present disclosure may be configured to set and retrieve the dynamic state required for a given operation. These operations may require a state to be set before processing user data. Subsequently, the state may be retrieved at the end of processing. Similarly, each circuitry component of hardware acceleration unit 102 may be configured to set the static variables required for a particular operation. For example, in the case of a cipher bundle the contents of the configuration register may indicate the type of cipher operations to perform (e.g., RC4, DES, 3DES, etc.) and how to interpret the remaining commands in the bundle. The keys may be set, the IV may be set and the new updated IV may be obtained at the end of the payload operation. The updated IV may be the state used at the beginning of the next payload. Hardware acceleration unit 102 may be scalable and configured so that additional circuitry components may be added. In some embodiments, a specific operation may be used in different circuitry components. For example, some operations may be used as both cipher and authentication operations. In this case, the operation may be duplicated in the required circuitry.

The circuitry described herein may further include additional components or circuitry not shown or described herein. For example, PKE circuitry 112 may include additional components, which may include, but are not limited to, modular math processors and multipliers, which may be configured to perform mathematical operations on operands of varying size.

A security application may utilize various protocols to establish adequate security connections. This may involve an initialization negotiation that may occur at the beginning of the session. The type of cipher and authentication operation to be used may be agreed upon and the initial variables may be calculated or set (e.g., keys, initial IV's, initial hash state, etc). These initial variables may be stored in memory in a data structure.

Hardware configuration register 220 may be populated with initialization data via application layer software (not shown). This software may create the data needed to populate the register based upon the cipher and authentication operations that are in use. The firmware of microengine 106 may transfer the configuration data directly from memory 104 into configuration register 220 without knowing the actual contents of register 220. The application layer software processor may also initialize a control block that may contain different types of information. In some embodiments, information pertaining to the size of various operation parameters and the location of the parameters in the session data structure may be included within the control block. Some parameters may include, but are not limited to, key size, IV size and hash state size. The initialization of the configuration register data and the control block may allow for the utilization of a single code path in firmware. Thus, the microengine firmware may use the same set of instructions for processing user data on a given circuitry component, regardless of the actual hardware operation that is in use.

Figure 3:
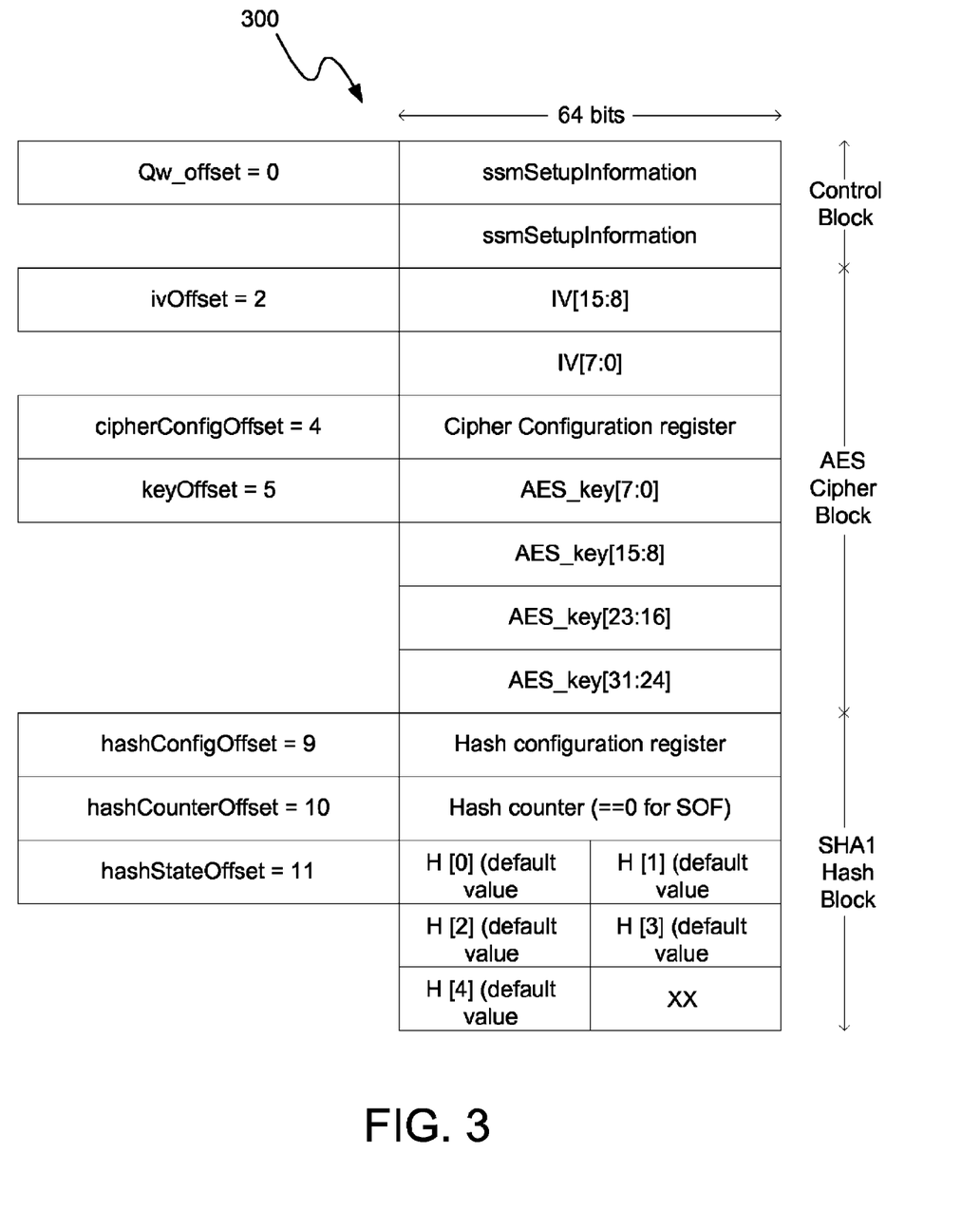
FIG. 3 is a diagram showing an example data structure in accordance with another exemplary embodiment of the present disclosure.

FIG. 3 shows an embodiment of an example of a source buffer data structure that may be populated for use with the cipher operation AES256 and the authentication operation SHA1. Of course, other operations may be used without departing from the scope of the present disclosure. In some embodiments, the entire data structure may be read from external memory 114 directly into shared memory 104. The ssmSetupInformation fields, denoted by the control block in FIG. 3, may be the only fields that are actually read into microengine 106. Microengine 106 may use this information to transfer the operation specific fields (e.g., keys, hash state, IV, etc.) directly from shared memory 104 to a particular circuitry component. Table 1 shown below illustrates one particular embodiment of a control block in accordance with the present disclosure.

TABLE 1

| Bit | Field Name | Value |
|---|---|---|
| | | QW 0 |
| [63:48] | Reserved | Reserved for high level protocol specific use (e.g. Secure Sockets Layer (SSL) and/or Internet Protocol Security (IPSec)) |
| [47:32] | ivSize | 16B |
| [31:24] | ivOffset | 2 |
| [23:16] | keySize | 32 |
| [15:7] | keyOffset | 5 |
| [7:0] | cipherConfigOffset | 4 |
| | | QW 1 |
| [63:56] | Reserved | Reserved for high level protocol specific use (e.g. SSL, IPSec) |
| [55:48] | icvLength | 24 |
| [47:40] | hashStateOffset | 11 |
| [39:32] | hashConfigOffset | 9 |
| [31:0] | Reserved | Reserved for high level protocol specific use (e.g. SSL, IPSec) |

The microcode may use the control block to generate the address of each of the operation specific fields within shared memory 104. Using this address information, along with the field size provided by the control block, the microcode may load the necessary operation parameters directly from shared memory 104 into a particular circuitry component by issuing a write from shared memory 104 to the component (e.g., cipher circuitry 108). The location and size of each parameter may be encoded within the control word. Microengine 106 may use this information to load the required parameters without having any knowledge of the actual operation being performed.

Figure 4:
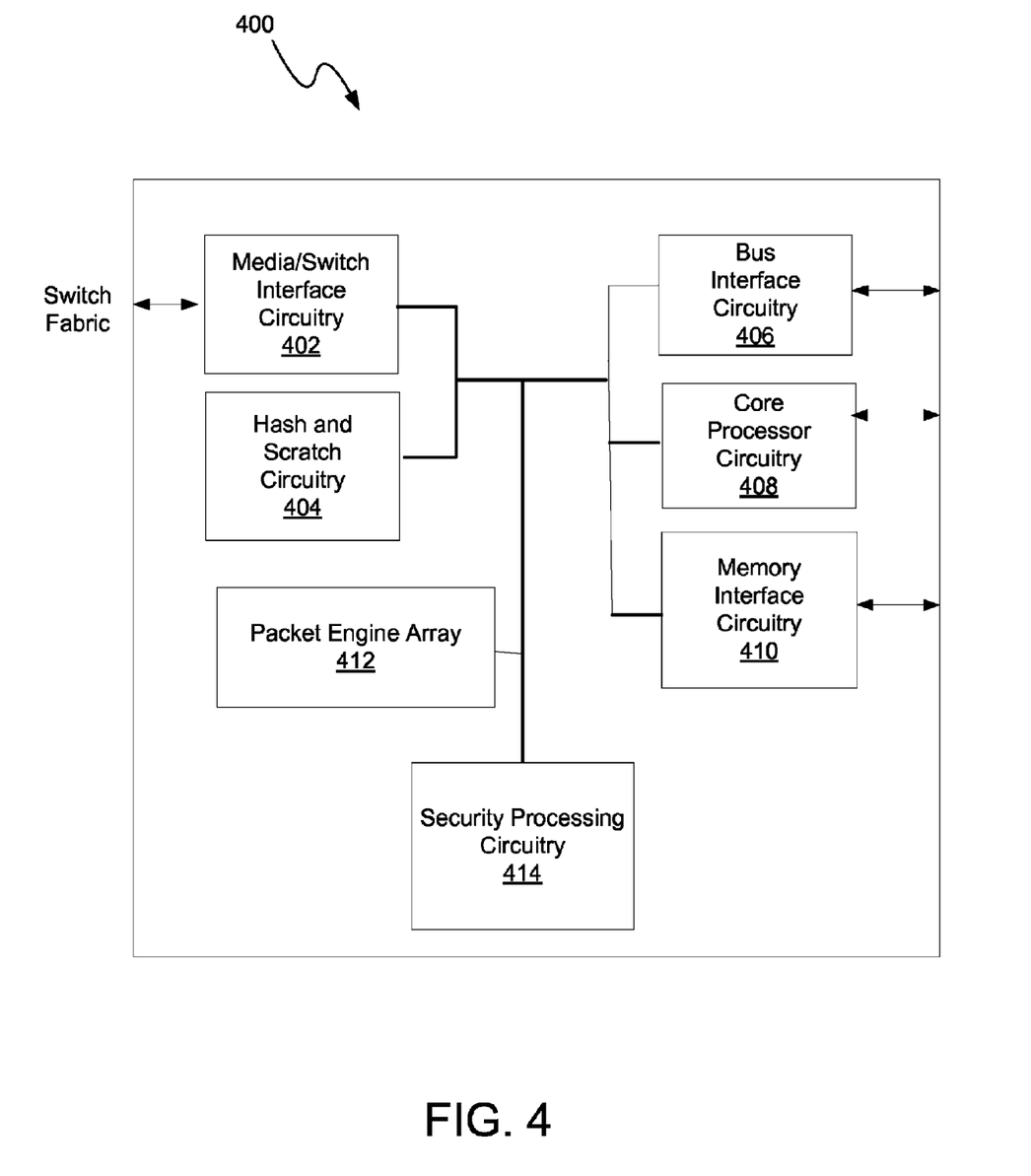
FIG. 4 is a block diagram depicting portions of a network processor in accordance with yet another exemplary embodiment of the present disclosure.

The embodiments of FIGS. 1-3 may be implemented, for example, in a variety of multi-threaded processing environments. For example, FIG. 4 is a diagram illustrating one exemplary integrated circuit embodiment (IC) 400 that may be configured to include any or all of the aspects of FIGS. 1-3. "Integrated circuit", as used in any embodiment herein, may refer to a semiconductor device and/or microelectronic device, such as, for example, but not limited to, a semiconductor integrated circuit chip. The IC 400 of this embodiment may include features of an Intel® Internet eXchange network processor (IXP). However, the IXP network processor is only provided as an example, and the operative circuitry described herein may be used in other network processor designs and/or other multi-threaded integrated circuits.

The IC 400 may include media/switch interface circuitry 402 (e.g., a CSIX interface) capable of sending and receiving data to and from devices connected to the integrated circuit such as physical or link layer devices, a switch fabric, or other processors or circuitry. The IC 400 may also include hash and scratch circuitry 404 that may execute, for example, polynomial division (e.g., 48-bit, 64-bit, 128-bit, etc.), which may be used during some packet processing operations. The IC 400 may also include bus interface circuitry 406 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from the IC 400 or external memory. The IC may also include core processor circuitry 408. In this embodiment, core processor circuitry 408 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 408 may comprise other types of processor core circuitry without departing from this embodiment. Core processor circuitry 408 may perform "control plane" tasks and management tasks (e.g., look-up table maintenance, etc.). Alternatively or additionally, core processor circuitry 408 may perform "data plane" tasks (which may be typically performed by the packet engines included in the packet engine array 412, described below) and may provide additional packet processing threads.

Integrated circuit 400 may also include a packet engine array 412, which may include a plurality of packet engines. Each packet engine may provide multi-threading capability for executing instructions from an instruction set, such as a reduced instruction set computing (RISC) architecture. Each packet engine in the array 412 may be capable of executing processes such as packet verifying, packet classifying, packet forwarding, and so forth, while leaving more complicated processing to the core processor circuitry 408. Each packet engine in the array 412 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 400 may also include memory interface circuitry 410. Memory interface circuitry 410 may control read/write access to external memory. Machine readable firmware program instructions may be stored in external memory, and/or other memory internal to the IC 400. These instructions may be accessed and executed by the integrated circuit 400. When executed by the integrated circuit 400, these instructions may result in the integrated circuit 400 performing any or all of the operations described herein.

IC 400 may further include security processing circuitry 414. Security processor circuitry 414 may be configured to perform encryption and/or decryption operations (e.g., cipher and authentication operations) and may include any or all of the embodiments described herein. For example, security processor circuitry 414 may include any or all of the components shown and described in the Figures, such as hardware acceleration unit 102.

Figure 5:
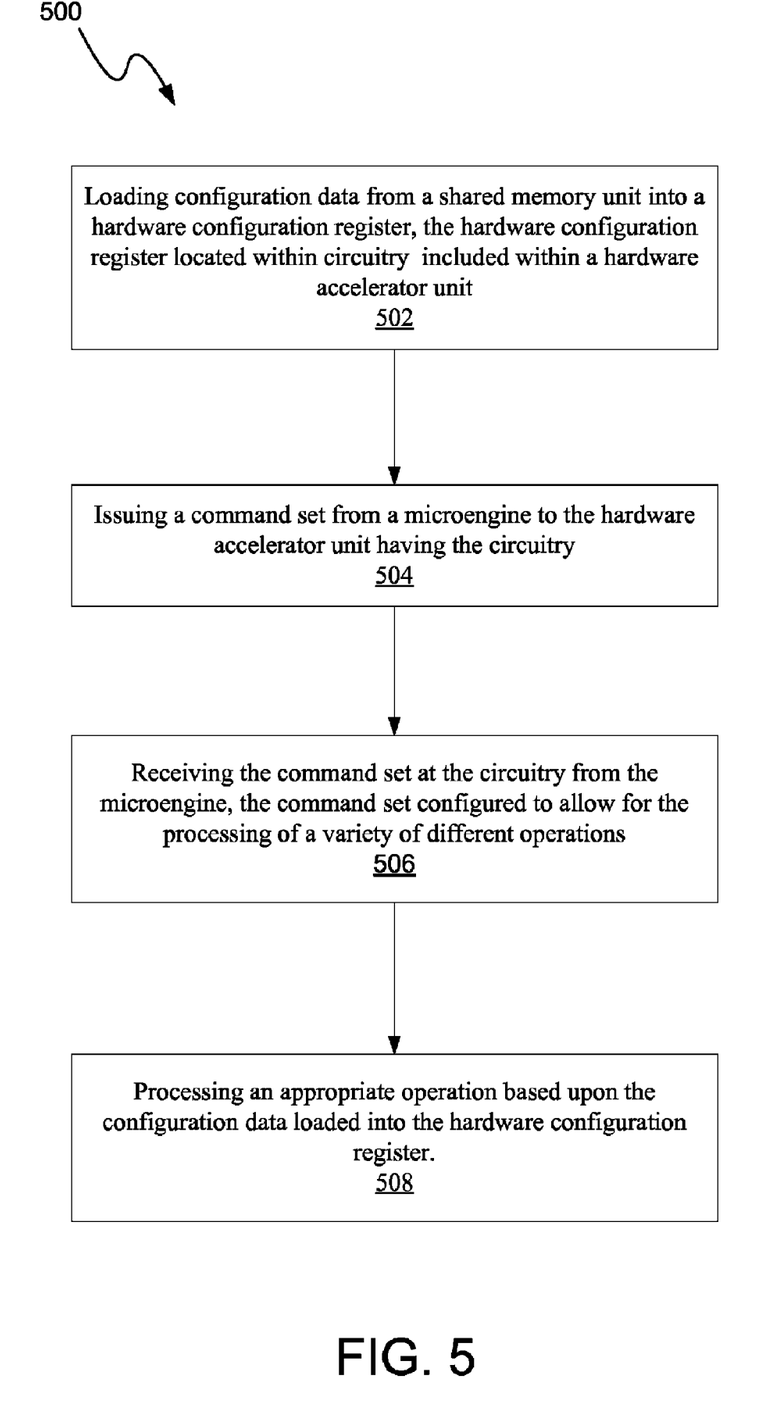
FIG. 5 is a flowchart showing operations in accordance with an additional exemplary embodiment of the present disclosure.

FIG. 5 is a flowchart 500 illustrating one method consistent with the present disclosure. Flowchart 500 depicts operations, which may include loading configuration data from a shared memory unit into a hardware configuration register, the hardware configuration register located within circuitry included within a hardware accelerator unit (502). Operations may further include issuing a command set from a microengine to the hardware accelerator unit having the circuitry (504). Operations may also include receiving the command set at the circuitry from the microengine, the command set configured to allow for the processing of a variety of different operations (506). Operations may additionally include processing an appropriate operation based upon the configuration data loaded into the hardware configuration register (508). Of course, additional operations are also envisioned, such as, for example, managing the movement of configuration data to and from the plurality of circuitry components.

Figure 6:
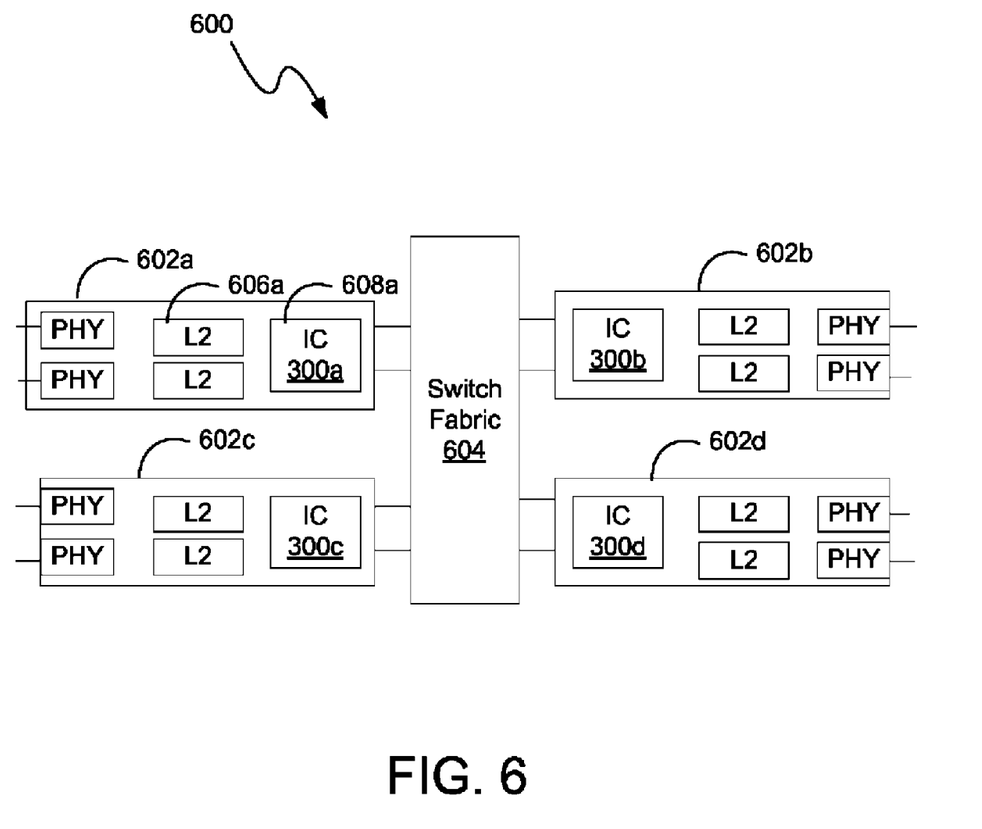
FIG. 6 is a diagram illustrating one exemplary system embodiment in accordance with the present disclosure.

FIG. 6 depicts one exemplary system embodiment 600. This embodiment may include a collection of line cards 602a, 602b, 602c and 602d ("blades") interconnected by a switch fabric 604 (e.g., a crossbar or shared memory switch fabric). The switch fabric 604, for example, may conform to CSIX or other fabric technologies such as HyperTransport™, I/O Link Specification, Revision 3.0, available from HyperTransport™ Technology Consortium, Apr. 21, 2006; Infiniband™, Specification 1.2, available from InfiniBand™ Trade Association, Sep. 8, 2004; PCI-X 2.0, Revision 1.0, Apr. 5, 2002; Packet-Over-SONET; RapidIO, Specification 1.3, available from RapidIO Trade Association, June 2005; and Utopia Specification Level 1, Version 2.01, available from the ATM Forum, Mar. 21, 1994. Individual line cards (e.g., 602a) may include one or more physical layer (PHY) devices 602a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 606a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 300a, which may include network processors, and may be embodied as integrated circuit packages (e.g., ASICs). In addition to the operations described above with reference to integrated circuit 300, in this embodiment integrated circuit 300a may also perform packet processing operations for packets received via the PHY(s) 602a and direct the packets, via the switch fabric 604, to a line card providing the selected egress interface.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

In some embodiments, the embodiments shown herein may be configured as a "network device", which may comprise for example, a switch, a router, a hub, and/or a computer node element configured to process data packets, a plurality of line cards connected to a switch fabric (e.g., a system of network/telecommunications enabled devices) and/or other similar device. Also, the term "cycle" as used herein may refer to clock cycles. Alternatively, a "cycle" may be defined as a period of time over which a discrete operation occurs which may take one or more clock cycles (and/or fraction of a clock cycle) to complete. Additionally, the operations described above with reference to FIG. 5 may be executed on one or more integrated circuits of a computer node element, for example, executed on a host processor (which may comprise, for example, an Intel™ Pentium™ microprocessor and/or an Intel™ Pentium™ D dual core processor and/or other processor that is commercially available from the Assignee of the subject application) and/or chipset processor and/or application specific integrated circuit (ASIC) and/or other integrated circuit.

The embodiments described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Accordingly, at least one embodiment described herein may provide a method capable of processing an operation. The method may include loading configuration data from a shared memory unit into a hardware configuration register, the hardware configuration register located within circuitry included within a hardware accelerator unit. The method may further include issuing a command set from a microengine to the hardware accelerator unit having the circuitry and receiving the command set at the circuitry from the microengine, the command set configured to allow for the processing of a variety of different operations. The method may also include processing an appropriate operation based upon the configuration data loaded into the hardware configuration register.

The present disclosure may provide numerous advantages over the prior art. The hardware and software features described herein may allow a single set of instructions to process a packet for a given circuitry component, regardless of the actual operation being performed. For example, the same microengine firmware instructions (i.e., hardware commands) may be used to cipher a packet, regardless of whether the operation is DES, 3DES, RC4, etc. The same approach may be applied equally to the other circuitry components. The embodiments described herein may be used to minimize the amount of code required, allowing the firmware to implement higher level protocol functionality for various security protocols, such as Internet Protocol Security (IPSec), Secure Sockets Layer (SSL) and Transport Layer Security (TLS).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system for processing an operation, comprising:
a hardware accelerator unit comprising a plurality of types of circuitries;
a microengine configured to issue a plurality of command sets to the hardware accelerator unit, wherein each type of circuitry is configured to receive one command set from the microengine and each command set is configured to allow processing of a plurality of different sets of operations by one type of circuitry;
a shared memory unit operatively connected to the microengine, the shared memory unit configured to store control information for access by the microengine, wherein the control information is configured to specify at least one set of operations for processing by the one type of circuitry; and
a hardware configuration register located within each of the plurality of circuitries, the hardware configuration register configured to receive configuration data from the microengine, wherein the configuration data corresponds to the specified at least one set of operations.

2. The system according to claim 1, wherein
the different sets of operations are selected from the group consisting of cipher operations and authentication operations.

3. The system according to claim 1, wherein
the plurality of types of circuitries include cipher circuitry, authentication circuitry and public key encryption circuitry.

4. The system according to claim 2, wherein
the cipher operations are selected from the group consisting of DES, 3DES, AES-128, AES-256, RC4 and Kasumi.

5. The system according to claim 2, wherein
the authentication operations are selected from the group consisting of MD5, SHA-1 and SHA-X.

6. The system according to claim 1, further comprising
an external memory unit configured to store information that may be accessed by the shared memory unit, the external memory unit further configured to access information that may be stored by the shared memory unit.

7. The system according to claim 1, wherein
the configuration data is selected from the group consisting of cipher keys, cipher initialization vectors, cipher padding and hash state.

8. An apparatus, comprising:
an integrated circuit (IC) configured to load configuration data from a shared memory unit into a hardware configuration register, the hardware configuration register located within one type of circuitry included within a hardware accelerator unit wherein the hardware acceleration unit comprises a plurality of types of circuitries, the IC further configured to issue one command set of a plurality of command sets from a microengine to the hardware accelerator unit having the circuitry wherein each command set is configured to allow processing of a plurality of different sets of operations by the one type of circuitry, the IC further configured to receive the command set from the microengine at the one type of circuitry, the IC further configured to process an appropriate set of operations based upon the configuration data loaded into the hardware configuration register.

9. The apparatus of claim 8, wherein
the plurality of different sets of operations are selected from the group consisting of cipher operations and authentication operations.

10. The apparatus according to claim 8, wherein
the plurality of circuitries include cipher circuitry, authentication circuitry and public key encryption circuitry.

11. The apparatus according to claim 9, wherein
the cipher operations are selected from the group consisting of DES, 3DES, AES-128, AES-256, RC4 and Kasumi.

12. The apparatus according to claim 9, wherein
the authentication operations are selected from the group consisting of MD5, SHA-1 and SHA-X.

13. The apparatus according to claim 9, further comprising
an external memory unit configured to store information that may be accessed by the shared memory unit, the external memory unit further configured to access information that may be stored by the shared memory unit.

14. An article comprising a storage medium having stored thereon instructions that when executed by a machine result in the following:
loading configuration data from a shared memory unit into a hardware configuration register, the hardware configuration register located within one type of circuitry included within a hardware accelerator unit, wherein the hardware acceleration unit comprises a plurality of types of circuitries;
issuing one command set of a plurality of command sets from a microengine to the hardware accelerator unit having the circuitry, wherein each command set is configured to allow processing of a plurality of different sets of operations by the one type of circuitry;
receiving the command set from the microengine at the one type of circuitry; and
processing an appropriate set of operations based upon the configuration data loaded into the hardware configuration register.

15. The article according to claim 14, wherein
the different sets of operations are selected from the group consisting of cipher operations and authentication operations.

16. The article according to claim 14, wherein
the circuitry may be selected from the group consisting of cipher circuitry, authentication circuitry and public key encryption circuitry.

17. The article according to claim 15, wherein
the cipher operations are selected from the group consisting of DES, 3DES, AES-128, AES-256, RC4 and Kasumi.

18. The article according to claim 15, wherein
the authentication operations are selected from the group consisting of MD5, SHA-1 and SHA-X.

19. The article according to claim 14, further comprising
managing the movement of configuration data to and from the plurality of circuitries.

20. The article according to claim 19, wherein
the configuration data is selected from the group consisting of cipher keys, cipher initialization vectors, cipher padding and hash state.

21. A method comprising
loading configuration data from a shared memory unit into a hardware configuration register, the hardware configuration register located within one type of circuitry included within a hardware accelerator unit, wherein the hardware acceleration unit comprises a plurality of types of circuitries;
issuing one command set of a plurality of command sets from a microengine to the hardware accelerator unit having the circuitry, wherein each command set is configured to allow processing of a plurality of different sets of operations by the one type of circuitry;
receiving the command set from the microengine at the one type of circuitry; and
processing an appropriate set of operations based upon the configuration data loaded into the hardware configuration register.

22. The method according to claim 21, further comprising storing configuration data within a shared memory unit.

23. The method according to claim 22, further comprising storing processed data in the shared memory unit, the processed data capable of being accessed by the external memory unit.

24. The method according to claim 21, further comprising managing the movement of configuration data to and from the plurality of circuitries.

25. The method according to claim 24, wherein
the configuration data is selected from the group consisting of cipher keys, cipher initialization vectors, cipher padding and hash state.

26. A system comprising:
a plurality of line cards and a switch fabric interconnecting said plurality of line cards, at least one line card comprising:
  at least one physical layer component (PHY); and
  an integrated circuit (IC) comprising a hardware accelerator unit comprising a plurality of types of circuitries; the IC configured to issue a plurality of command sets to the hardware accelerator unit, wherein each type of circuitry is configured to receive one command set from the IC and each command set is configured to allow processing of a plurality of different sets of operations by one type of circuitry; the IC further configured to store control information in a shared memory unit for access by a microengine.

27. The system according to claim 26, wherein
the IC is further configured to populate a plurality of hardware configuration registers with data, the hardware configuration registers included within the plurality of circuitries.

28. The system according to claim 27, wherein
the IC is further configured to set and retrieve a dynamic state for a given operation via a dynamic state register.

29. The system according to claim 27, wherein
the IC is further configured to set a static variable required for a given operation via a static state register.

* * * * *